(12) United States Patent
Kim et al.

(10) Patent No.: US 9,325,635 B2
(45) Date of Patent: Apr. 26, 2016

(54) METHOD AND NODE FOR PREVENTING COLLISION BETWEEN NETWORKS COMMUNICATING BASED ON CSMA/CA

(71) Applicants: Young Soo Kim, Seoul (KR); Chang Soon Park, Chungju-si (KR); Young Jun Hong, Seoul (KR); Yongok Kim, Seoul (KR); Minchae Jung, Seoul (KR); Sooyong Choi, Seoul (KR); Kyuho Hwang, Seoul (KR)

(72) Inventors: Young Soo Kim, Seoul (KR); Chang Soon Park, Chungju-si (KR); Young Jun Hong, Seoul (KR); Yongok Kim, Seoul (KR); Minchae Jung, Seoul (KR); Sooyong Choi, Seoul (KR); Kyuho Hwang, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 461 days.

(21) Appl. No.: 13/675,470

(22) Filed: Nov. 13, 2012

(65) Prior Publication Data

US 2013/0188653 A1 Jul. 25, 2013

(30) Foreign Application Priority Data

Jan. 25, 2012 (KR) ........................ 10-2012-0007293

(51) Int. Cl.
| | | |
|---|---|---|
| *H04B 7/212* | (2006.01) | |
| *H04L 12/911* | (2013.01) | |
| *H04L 12/413* | (2006.01) | |
| *H04L 12/403* | (2006.01) | |
| *H04J 3/06* | (2006.01) | |

(52) U.S. Cl.
CPC .......... *H04L 47/826* (2013.01); *H04L 12/4035* (2013.01); *H04L 12/413* (2013.01); *H04J 3/0658* (2013.01)

(58) Field of Classification Search
CPC ............ H04W 76/04; H04W 74/0816; H04W 74/0825; H04W 74/085; H04W 74/0858; H04W 28/0236; H04W 28/0284; H04W 74/02; H04W 8/30; H04W 24/02; H04W 24/00; H04L 12/413; H04L 47/826; H04L 1/0021; H04L 1/0026; H04J 3/16
USPC .................................................. 370/328–503
See application file for complete search history.

(56) References Cited

U.S. PATENT DOCUMENTS

| | | |
|---|---|---|
| 5,717,889 A | 2/1998 | Rettig |
| 6,078,591 A | 6/2000 | Kalkunte et al. |

(Continued)

FOREIGN PATENT DOCUMENTS

| | | |
|---|---|---|
| KR | 10-0261156 B1 | 4/2000 |
| KR | 10-2004-0105310 A | 12/2004 |

(Continued)

*Primary Examiner* — Nicholas Sloms
(74) *Attorney, Agent, or Firm* — NSIP Law

(57) ABSTRACT

A method and a target node for preventing collisions between networks communicating based on a carrier sense multiple access/collision avoidance (CSMA/CA) scheme, are provided. The method includes synchronizing an object network with a neighboring network. The method further includes allocating, to the object network, a slot index based on a number of the networks, and a contention window (CW) size. The method further includes setting, for the object network, a back-off counter value based on the CW size. The method further includes reducing the back-off counter value based on a channel state of the object network, and the slot index. The method further includes transmitting data related to the neighboring network based on the back-off counter value.

27 Claims, 6 Drawing Sheets

(56) References Cited

U.S. PATENT DOCUMENTS

| | | | |
|---|---|---|---|
| 7,502,365 B2* | 3/2009 | Yamagata | 370/366 |
| 7,570,656 B2* | 8/2009 | Raphaeli et al. | 370/445 |
| 7,626,931 B2* | 12/2009 | Wu et al. | 370/232 |
| 7,656,831 B2* | 2/2010 | Gao et al. | 370/311 |
| 7,664,132 B2 | 2/2010 | Benveniste | |
| 7,801,104 B2 | 9/2010 | Gaur | |
| 7,881,340 B2* | 2/2011 | Farrag et al. | 370/468 |
| 8,036,241 B2* | 10/2011 | Ji et al. | 370/443 |
| 8,675,678 B2* | 3/2014 | Farrag et al. | 370/447 |
| 8,705,505 B2* | 4/2014 | Kwak et al. | 370/338 |
| 2003/0103521 A1* | 6/2003 | Raphaeli et al. | 370/445 |
| 2004/0047319 A1* | 3/2004 | Elg | 370/338 |
| 2005/0239411 A1* | 10/2005 | Hazra et al. | 455/67.11 |
| 2006/0215556 A1* | 9/2006 | Wu et al. | 370/230 |
| 2006/0285527 A1* | 12/2006 | Gao et al. | 370/338 |
| 2006/0285528 A1* | 12/2006 | Gao et al. | 370/338 |
| 2007/0019604 A1* | 1/2007 | Hur et al. | 370/347 |
| 2007/0060158 A1* | 3/2007 | Medepalli et al. | 455/450 |
| 2007/0133448 A1* | 6/2007 | Gao et al. | 370/311 |
| 2008/0130519 A1* | 6/2008 | Bahl et al. | 370/254 |
| 2008/0219286 A1* | 9/2008 | Ji et al. | 370/445 |
| 2009/0088175 A1* | 4/2009 | Pelletier et al. | 455/450 |
| 2009/0103501 A1* | 4/2009 | Farrag et al. | 370/337 |
| 2009/0196273 A1* | 8/2009 | Kwon et al. | 370/343 |
| 2011/0182178 A1* | 7/2011 | Du et al. | 370/230 |
| 2012/0182867 A1* | 7/2012 | Farrag et al. | 370/230 |
| 2012/0257585 A1* | 10/2012 | Sydor et al. | 370/329 |
| 2013/0188653 A1* | 7/2013 | Kim et al. | 370/442 |
| 2013/0294232 A1* | 11/2013 | Segev et al. | 370/230 |

FOREIGN PATENT DOCUMENTS

| | | |
|---|---|---|
| KR | 10-0644582 B1 | 11/2006 |
| KR | 10-2008-0080726 A | 9/2008 |
| KR | 10-2010-0125035 A | 11/2010 |

* cited by examiner

METHOD AND NODE FOR PREVENTING COLLISION BETWEEN NETWORKS COMMUNICATING BASED ON CSMA/CA

CROSS-REFERENCE TO RELATED APPLICATION(S)

This application claims the benefit under 35 U.S.C. §119 (a) of Korean Patent Application No. 10-2012-0007293, filed on Jan. 25, 2012, in the Korean Intellectual Property Office, the entire disclosure of which is incorporated herein by reference for all purposes.

BACKGROUND

1. Field

The following description relates to a method and a target node for preventing collision between networks communicating based on a carrier sense multiple access/collision avoidance (CSMA/CA) scheme.

2. Description of Related Art

A conventional carrier sense multiple access/collision avoidance (CSMA/CA) scheme does not consider a case in which homogeneous networks coexist. In such a case, collision between signals of neighboring networks may frequently occur, which may increase a selection range of a back-off counter of each node included in the networks up to a maximum contention window (CW) size. That is, a collision rate may be increased as a number of nodes participating in contention increases, and consequently, the back-off counter value of each node may be increased. As a result, efficiency may be reduced for usage of resources. If homogeneous networks exist adjacent to one another in a narrow area, the collision rate may be further increased, and the efficiency may be further reduced.

SUMMARY

In one general aspect, there is provided a method of preventing collision between networks communicating based on a carrier sense multiple access/collision avoidance (CSMA/CA) scheme, the method including synchronizing an object network with a neighboring network. The method further includes allocating, to the object network, a slot index based on a number of the networks, and a contention window (CW) size. The method further includes setting, for the object network, a back-off counter value based on the CW size. The method further includes reducing the back-off counter value based on a channel state of the object network, and the slot index. The method further includes transmitting data related to the neighboring network based on the back-off counter value.

The method may further include allocating, to the object network, a back-off counter reduction period based on the number of the networks.

The synchronizing may include synchronizing a time period between the neighboring network and the object network with a first time period based on the number of the networks. The synchronizing may further include synchronizing a time period in the object network with a second time period, which is distinguished from the first time period.

The allocating may include allocating, to the object network, the slot index based on a beacon shifting sequence index, or a network identifier (ID), or any combination thereof.

The reducing may include determining whether the channel state is an idle state. The reducing may further include determining whether the slot index corresponds to an index of a time slot of the neighboring network and the object network. The reducing may further include reducing the back-off counter value if the channel state is the idle state, and the slot index corresponds to the index.

The transmitting may include determining whether the back-off counter value is equal to zero. The transmitting may further include transmitting the data if the back-off counter value is equal to zero.

The method may further include determining whether a response to the transmitting is received. The method may further include resuming contention for transmission of the data if the response to the transmitting is received.

The method may further include determining whether the CW size is less than a maximum CW size of the neighboring network and the object network. The method may further include increasing the CW size if the CW size is less than the maximum CW size. The resuming may include resuming the contention for the transmission of the data based on the increased CW size.

A non-transitory computer-readable storage medium may store a program including instructions to cause a computer to implement the method.

In another general aspect, there is provided a method of preventing collision between networks communicating based on a carrier sense multiple access/collision avoidance (CSMA/CA) scheme, the method including synchronizing an object network with a neighboring network. The method further includes allocating, to the object network, a slot index based on a number of the networks, and a contention window (CW) size. The method further includes setting, for the object network, a back-off counter value based on the CW size. The method further includes reducing the back-off counter value based on a channel state of the object network. The method further includes transmitting data related to the neighboring network based on the back-off counter value, the slot index, and the channel state.

The reducing may include determining whether the channel state is an idle state. The reducing may further include reducing the back-off counter value if the channel state is the idle state.

The transmitting may include determining whether the back-off counter value is equal to zero. The transmitting may further include determining whether the slot index corresponds to an index of a time slot of the neighboring network and the object network, and whether the channel state is an idle state. The transmitting may further include transmitting the data if the back-off counter value is equal to zero, the slot index corresponds to the index, and the channel state is the idle state.

In still another general aspect, there is provided a target node configured to prevent collision between networks communicating based on a carrier sense multiple access/collision avoidance (CSMA/CA) scheme, the target node including a synchronization unit configured to synchronize the target node with a neighboring node. The target node further includes an allocation unit configured to allocate, to the target node, a slot index based on a number of the networks, and a contention window (CW) size. The target node further includes a set unit configured to set, for the target node, a back-off counter value based on the CW size. The target node further includes a reduction unit configured to reduce the back-off counter value based on a channel state of the target node, and the slot index. The target node further includes a transmission unit configured to transmit data related to the neighboring node based on the back-off counter value.

The synchronization unit may be further configured to synchronize a time period between the neighboring node and the target node with a first time period based on the number of the networks. The synchronization unit may be further configured to synchronize a time period in the target node with a second time period, which is distinguished from the first time period.

The allocation unit may be further configured to allocate, to the target node, a back-off counter reduction period based on the number of the networks. The allocation unit may be further configured to allocate, to the target node, the slot index based on a beacon shifting sequence index, or a network identifier (ID), or any combination thereof.

The reduction unit may be further configured to determine whether the channel state is an idle state. The reduction unit may be further configured to determine whether the slot index corresponds to an index of a time slot of the neighboring node and the target node. The reduction unit may be further configured to reduce the back-off counter value if the channel state is the idle state, and the slot index corresponds to the index.

The transmission unit may be further configured to determine whether the back-off counter value is equal to zero. The transmission unit may be further configured to transmit the data if the back-off counter value is equal to zero.

In yet another general aspect, there is provided a target node configured to prevent collision between networks communicating based on a carrier sense multiple access/collision avoidance (CSMA/CA) scheme, the target node including a synchronization unit configured to synchronize the target node with a neighboring node. The target node further includes an allocation unit configured to allocate, to the target node, a slot index based on a number of the networks, and a contention window (CW) size. The target node further includes a set unit configured to set, for the target node, a back-off counter value based on the CW size. The target node further includes a reduction unit configured to reduce the back-off counter value based on a channel state of the target node. The target node further includes a transmission unit configured to transmit data related to the neighboring node based on the back-off counter value, the slot index, and the channel state.

The reduction unit may be further configured to determine whether the channel state is an idle state. The reduction unit may be further configured to reduce the back-off counter value if the channel state is the idle state.

The transmission unit may be further configured to determine whether the back-off counter value is equal to zero. The transmission unit may be further configured to determine whether the slot index corresponds to an index of a time slot of the neighboring node and the target node, and whether the channel state is an idle state. The transmission unit may be further configured to transmit the data if the back-off counter value is equal to zero, the slot index corresponds to the index, and the channel state is the idle state.

Other features and aspects will be apparent from the following detailed description, the drawings, and the claims.

Figure 1:
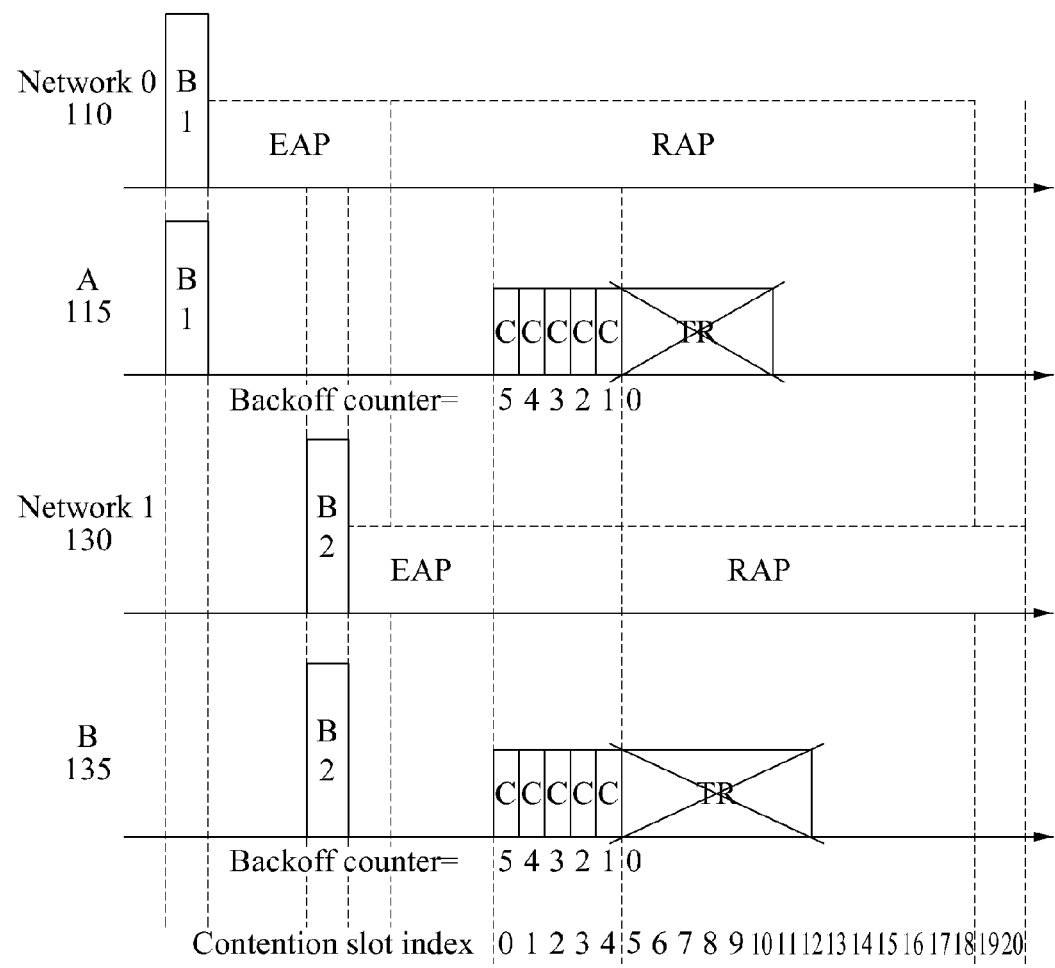
FIG. 1 is a diagram illustrating an example of signal collision between networks communicating based on a carrier sense multiple access/collision avoidance (CSMA/CA) scheme.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 is a diagram illustrating an example signal collision between networks communicating based on a carrier sense multiple access/collision avoidance (CSMA/CA) scheme. In an environment in which adjacent homogeneous networks coexist, although signals transmitted from one network do not collide, signal collision may occur due to signals transmitted from another adjacent network, thereby increasing a collision rate. If nodes included in each network operate based on the same time period and the same back-off counter reduction period, signal collisions are unavoidable.

For example, referring to FIG. 1, the homogeneous networks may include a network 0 110 and a network 1 130, which communicate based on the CSMA/CA. The network 0 110 and the network 1 130 include a node A 115 and a node B 135, respectively. The node A 115 and the node B 135 generate data B1 and data B2, respectively, to be transmitted. The node A 115 and the node B 135 may encapsulate the data B1 and the data B2, respectively, during an Extensible Authentication Protocol (EAP) period. The node A 115 and the node B 135 transmit the data B1 and the data B2, respectively, during a Route Access Protocol (RAP) period via respective signals TR.

If contention occurs between the respective signals TR at a contention slot index (e.g., 0), the node A 115 and the node B 135 wait to transmit (i.e., back-off from transmitting) the signals TR based on respective back-off counters. In this example, the contention slot index refers to an index of a time slot for an object network (e.g., the network 0 110) and at least one neighboring network (e.g., the network 1 130). Each of the back-off counters include a value of 5, and operate based on the same back-off counter reduction period C of 1 time slot or time interval. The back-off counter reduction period C refers to the time slot of reducing the back-off counter value by 1. Each of the back-off counters is reduced in value by 1 each time the node A 115 and the node B 135 respectively wait to transmit the signals TR, for 5 time slots. When the back-off counters are reduced to 0, the node A 115 and the node B 135 respectively transmit the corresponding signals TR. However, since the back-off counters include the same value, and operate based on the same back-off counter reduction period C, the node A 115 and the node B 135 transmit the respective signals TR at the same contention slot index (e.g., 5), thereby causing a collision between the signals TR.

The collision rate may abruptly increase as a number of adjacent networks increases. As a number of signal collisions increases, data loss increases. Furthermore, each of the nodes sets a contention window (CW) size to approximately a maximum CW size ($CW_{max}$) selectable by the nodes, in which the nodes may be in contention with each other and/or may reduce their respective back-off counter values. For example, as shown in FIG. 1, if each of the node A 115 and the node B 135 sets the CW size to the maximum CW size $CW_{max}$, for example, 5 time slots, a contention period is elongated, even though a signal collision occurs. Consequently, a resource use efficiency may be reduced.

Figure 2:
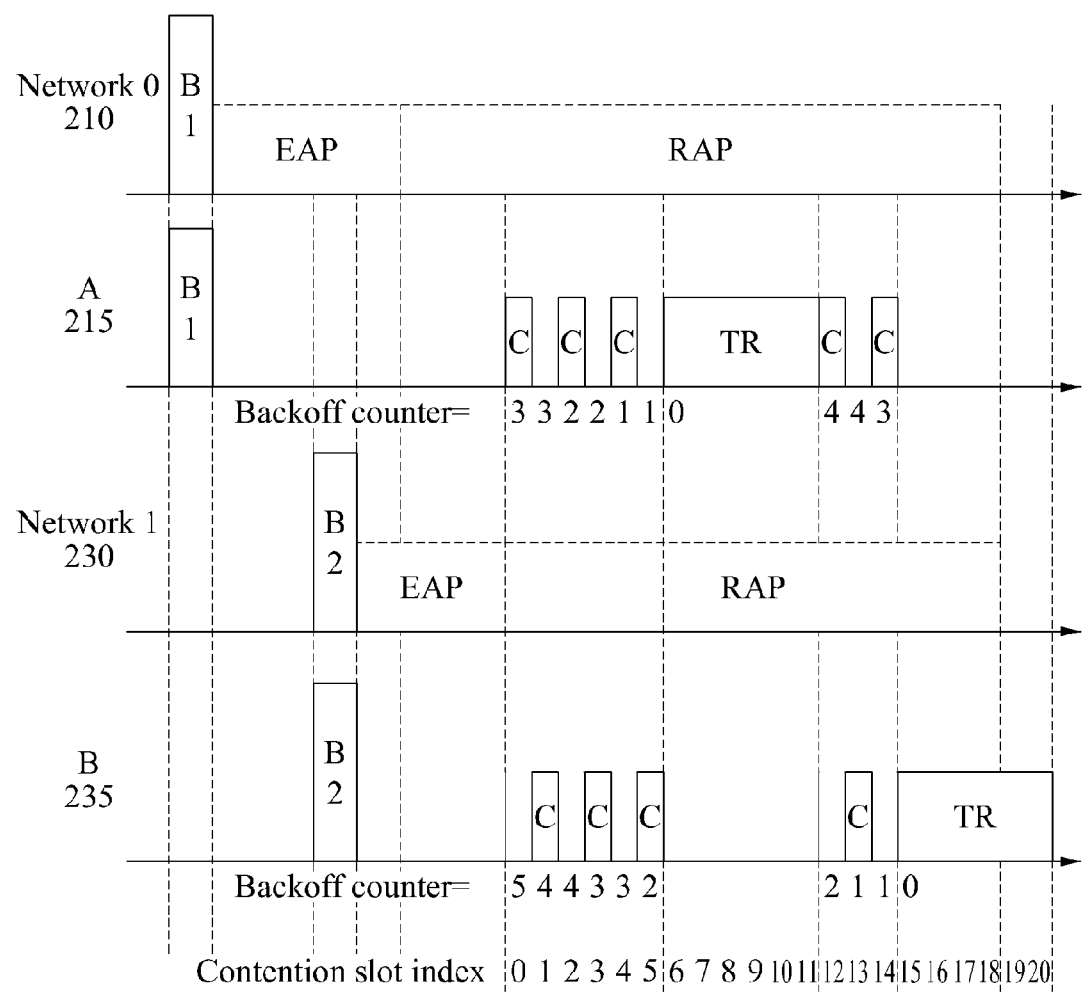
FIG. 2 is a diagram illustrating an example of a method of controlling a back-off counter reduction period in a method of preventing collision between networks communicating based on the CSMA/CA.

FIG. 2 illustrates an example of a method of controlling a back-off counter reduction period in a method of preventing collision between networks communicating based on the CSMA/CA scheme. Referring to FIG. 2, a network 0 210 and a network 1 230 coexist as neighbors, and communicate based on the CSMA/CA. The network 0 210 and the network 1 230 include a node A 215 and a node B 235, respectively.

The node A 215 reduces a value of its back-off counter by 1 (i.e., operates in the back-off counter reduction period C) only when a contention slot index equals 2k (k denoting a natural number). For example, the node A 215 reduces the back-off counter value by 1 at contention slot indices 0, 2, 4, 12, and 14. The node B 235 reduces a value of its back-off counter by 1 only when a contention slot index equals 2k+1, to be alternate with the node A 215. For example, the node B 235 reduces the back-off counter value by 1 at contention slot indices 1, 3, 5, and 13. That is, if a N number of networks coexist, each of the networks sets or allocates its slot index to a number n, and reduces a value of its back-off counter by 1 only when the slot index corresponds to a contention slot index of Nk+n (where n=0, 1, . . . , N−1). In the example of FIG. 2, the network 0 210 and the network 1 230 sets their slot indices to 0 and 1, respectively, which correspond to the contention slot indices of 2k and 2k+1, respectively. Thus, transmission time points of the network 0 210 and the network 1 230 do not overlap. Accordingly, signal collision is prevented.

The back-off counter reduction period C may be determined based on the number of the coexisting networks. For example, if an object network (e.g., the network 0 210) and at least one neighboring network (e.g., the network 1 230) coexist, as shown in FIG. 2, the total number of the networks, that is, 2, may be determined to be the back-off counter reduction period C. Therefore, a value of a back-off counter value of a target node (e.g., the node A 215) may be reduced by 1 every 2 contention slot indices.

If the number of the networks is relatively large, an efficiency of using time resources may abruptly decrease. Therefore, if the number of the networks is excessively large, one slot index may be allocated to several networks to be shared. Accordingly, the efficiency of using time resources may be increased.

Figure 3:
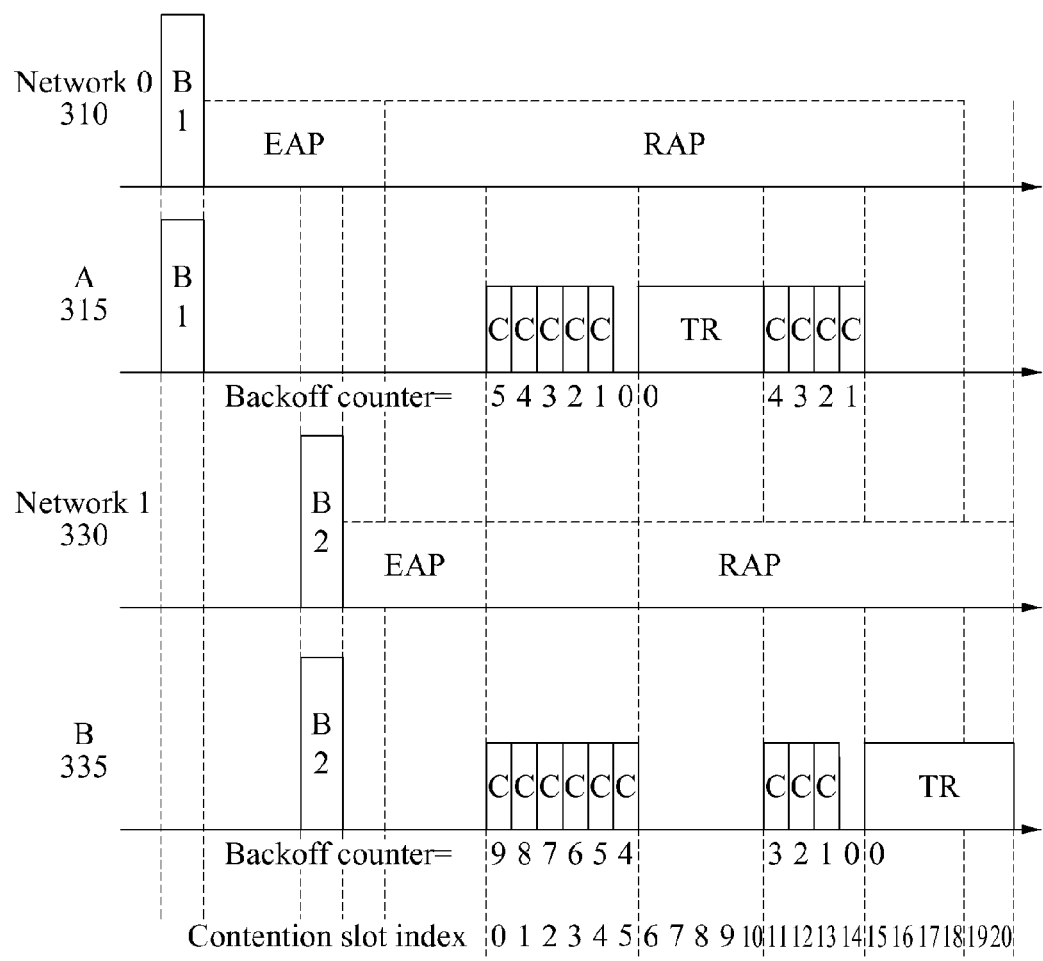
FIG. 3 is a diagram illustrating another example of a method of controlling a back-off counter reduction period in a method of preventing collision between networks communicating based on the CSMA/CA.

FIG. 3 illustrates another example of a method of controlling a back-off counter reduction period in a method of preventing collision between networks communicating based on the CSMA/CA. Different from the method of FIG. 2, according to the method of FIG. 3, a value of a back-off counter of a network is not reduced in only a defined slot index. Instead, data transmission may not be performed as soon as the back-off counter value becomes 0, but after it is confirmed that a contention slot index of an object network and at least one neighboring network, corresponds to a slot index allocated to the object network.

For example, referring to FIG. 3, a network 0 310 and a network 1 330 coexist as neighbors, and communicate based on the CSMA/CA. The network 0 310 and the network 1 330 include a node A 315 and a node B 335, respectively. The node A 315 transmits data B1 via a signal TR only when a value of its back-off counter becomes 0, and a slot index of 0 allocated to the network 0 310 corresponds a contention slot index of 2k, e.g., 6. The node B 335 transmits data B2 via a signal TR only when a value of its back-off counter becomes 0, and a slot index of 1 allocated to the network 1 330 corresponds to a contention slot index of 2k+1, e.g., 15. That is, if an N number of networks coexist, each of the networks sets or allocates its slot index to a number n, and transmits data only when a value of its back-off counter becomes 0, and the slot index corresponds to a contention slot index of Nk+n (where n=0, 1, . . . , N−1). As a result, signal collisions between the networks is prevented.

If a transmission slot is allocated based on the number of the networks, an efficiency of using time resources may be reduced while the collision rate may be increased. In this example, the efficiency of using time resources may be enhanced by sharing one slot index with several networks.

To prevent collisions between the neighboring networks by the method of adjusting the back-off counter reduction period as described with reference to FIGS. 2 and 3, synchronization of time between the neighboring networks is performed. Only through the time synchronization are contention slot indices of current time slots recognized by the networks and synchronized. Accordingly, the networks may be prevented from transmitting data in the same time slot.

A unit of the time synchronization between the neighboring networks does not have to be 1 time slot because a value referenced by each network to avoid the collision is not a definite index of a time slot, but rather, a relative index of the time slot. For example, if the N number of the networks coexist, the unit of the time synchronization between the networks may be N time slots rather than 1 time slot. A value referenced by each network for adjustment of the back-off counter reduction period may be a slot index mod N. Accordingly, each network may include a 2-step synchronization control method, which sets a period of the time synchronization between the neighboring networks and the object network to N time slots, and sets the unit of the time synchronization in the object network to 1 slot.

In addition, to prevent collisions between the neighboring networks by adjusting the back-off counter reduction period, negotiation between the networks may be performed to set a slot index of a back-off counter allocated to each network. However, if the negotiation between the networks is performed, the system may be complicated while a resource use efficiency is reduced. Therefore, instead of the negotiation, a system parameter may be used to prevent such loss. Although the following example uses the system parameter with reference to the 802.15.6 Body Area Network (BAN), which is a representative CSMA/CA system, this is only an example, and other system parameters may be used, such as network identifiers (IDs) and/or those known to one of ordinary skill in the art.

In a first example of using the system parameter to allocate a slot index to a back-off counter, a beacon shifting sequence index may be used. Beacon shifting refers to a coexistence strategy of the 802.15.6 BAN, which changes a position of a beacon in every super frame based on a randomly-generated sequence to prevent beacons of neighboring networks from continuously colliding. For example, different beacon shifting sequences may be used to prevent collisions between the respective networks, and, for this purpose, a different beacon shifting sequence index may be set for each respective network, as shown in Table 1 below. In this example, for each respective network, the beacon shifting sequence index may be used as a reducing slot index of a back-off counter so that additional negotiation between the networks may be omitted.

Figure 4:
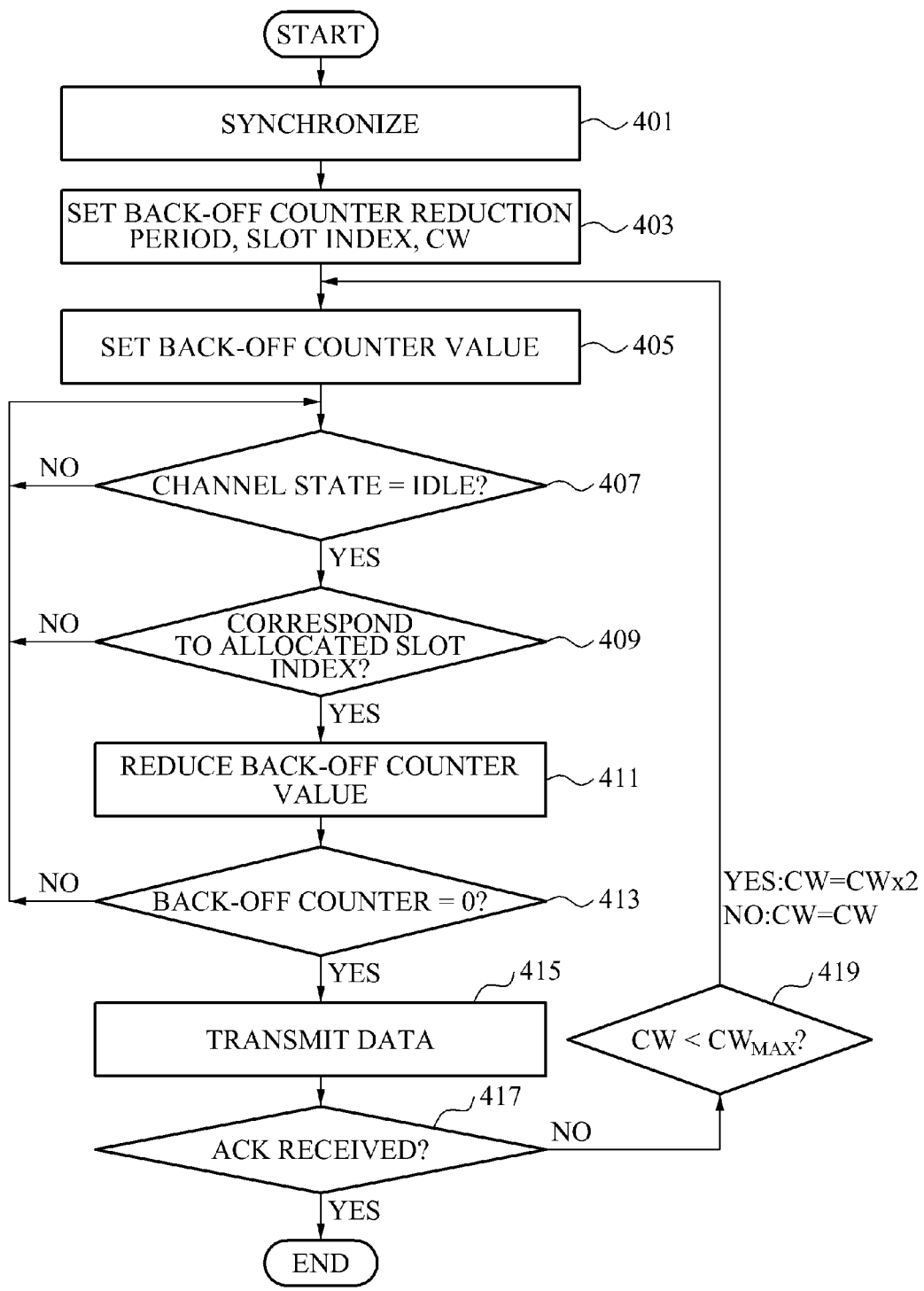
FIG. 4 is a flowchart illustrating an example of a method of preventing collision between networks communicating based on the CSMA/CA.

Referring to FIG. 4, in operation 401, the target node performs time synchronization with the neighboring networks. For example, the target node may synchronize a time period between the neighboring networks and the object network with a first time period, for example, a N-slot period, based on a number of the networks. In another example, the target node may synchronize a time period in the object network with a second time period, for example, an 1-slot period, which is distinguished from the first time period. In this example, the target node may synchronize the object network with the neighboring networks by the aforementioned 2-step synchronization control method. The target node may recognize the number of the networks or the nodes.

In operation 403, the target node sets or allocates a back-off counter reduction period for the neighboring networks and the object network, and a slot index for the object network, based on the number of the networks. Additionally, to prevent reduction of a resource use efficiency, the target node sets or allocates a contention window (CW) size smaller than a maxi-

TABLE 1

| Beacon Shifting Sequence Index m in decimal value | Beacon shifting Sequence as function of Beacon Shifting Sequence Phase n = 0, 1, 2, ..., 15 | Beacon Shifting Sequence pattern ("..." denotes pattern repeat) |
|---|---|---|
| 0 | $PN_0(n) = n \bmod 2$ | $PN_0(n) = 0, 1, 0, 1, \ldots$ |
| 1 | $PN_1(n) = 2 \times PN_0(n)$ | $PN_1(n) = 0, 2, 0, 2, \ldots$ |
| 2 | $PN_2(n) = n \bmod 4$ | $PN_2(n) = 0, 1, 2, 3, \ldots$ |
| 3 | $PN_3(n) = [PN_0(n) + PN_0(n)]/2 \bmod 2 + [PN_0(n) + PN_1(n) + PN_2(n)] \bmod 4$ | $PN_3(n) = 0, 1, 3, 2, \ldots$ |
| 4 | $PN_4(n) = [PN_0(n) + PN_1(n) + PN_2(n)]/2$ | $PN_4(n) = 0, 2, 1, 3, \ldots$ |
| 5 | $PN_5(n) = \{PN_2(n) + [PN_0(n) + PN_2(n)]/2\} \bmod 4$ | $PN_5(n) = 0, 2, 3, 1, \ldots$ |
| 6 | $PN_6(n) = PN_1(n) + \{[PN_0(n) + PN_2(n)]/2 \bmod 2\}$ | $PN_6(n) = 0, 3, 1, 2, \ldots$ |
| 7 | $PN_7(n) = [PN_1(n) + PN_2(n)] \bmod 4$ | $PN_7(n) = 0, 3, 2, 1, \ldots$ |
| 8-15 | Reserved | Reserved |

In a second example of using the system parameter to allocate a slot index to a back-off counter, network IDs of neighboring networks may be compared to one another, thereby setting the slot index. In more detail, a coexistence state of each network may be recognized through continuous detection of signals destined for a predetermined network ID of the network, and thus, the network ID may be obtained. Therefore, through comparison of obtained network IDs, a reducing slot index of a back-off counter may be set for each network in order of size.

For example, if the network IDs of the coexisting networks are 100, 101, ..., 100+N−1, reducing slot indices Nk+0, Nk+1, ..., Nk+N−1 may be set for respective back-off counters of the networks. Thus, if the slot index of the back-off counter is set based on comparing the network IDs, additional negotiation between the networks may be omitted.

FIG. 4 illustrates an example of a method of preventing collision between networks communicating based on the CSMA/CA. In this example, existence of the coexisting, neighboring networks is recognized first, and then, time between the networks is synchronized. The time synchronization is performed to synchronize contention slot indices of current time slots recognized by the respective networks so that the networks do not transmit data in the same slot. That is, through the time synchronization, one or more neighboring networks and an object network communicating based on the CSMA/CA operate based on the same time period, whereas back-off counter reduction periods of nodes included in each network are alternated. The object network includes a target node, while the neighboring networks include one or more respective neighboring nodes.

mum CW value $CW_{max}$ used in a non-coexistence environment, for the object network. The target node may allocate the slot index for the object network based on a system parameter including a beacon shifting sequence index and/or a network ID, of the object network.

In operation 405, the target node sets a back-off counter value for the object network to any one value selected based on the CW size. For example, the target node may set the back-off counter value to a value randomly selected from 1 to the CW size, that is, [1, CW].

Next, the target node reduces the back-off counter value for the object network based on a channel state of the target node and the slot index allocated to the objected network. In more detail, in operation 407, the target node determines whether the channel state is an idle state. If the channel state is the idle state, in operation 409, the target node determines whether the slot index allocated to the object network corresponds to a contention slot index of a current time slot for the neighboring networks and the object network. That is, the target node determines whether the contention slot index of the synchronized time slot corresponds to the slot index allocated to the object network including the target node. If the channel state is not the idle state, or if the slot index allocated to the object network fails to correspond to the contention slot index, the target node returns to operation 407, and waits until the channel state enters the idle state.

If the slot index allocated to the object network corresponds to the contention slot index, in operation 411, the target node reduces the back-off counter value by 1. If the back-off counter value becomes 0 by repeating the above-mentioned process, the target node transmits data. In more detail, in operation 413, the target node determines whether the back-off counter value is equal to 0. If the back-off counter value is equal to 0, in operation 415, the object network transmits the data related to the neighboring networks. If the back-off counter value is not equal to 0, the target node returns to operation 407, and waits until the channel state enters the idle state.

The target node resumes contention for the data transmission based on whether a response to the data transmission, that is, an acknowledgement (ACK) signal denoting successful data transmission is received from a receiving end of the data transmission. In more detail, in operation 417, the target node determines whether the ACK signal is received in response to the data transmission. If the ACK signal is received, the method ends. Conversely, if the ACK is not received, in operation 419, the target node determines whether the CW size for the object network is smaller than the maximum CW size $CW_{max}$ for the neighboring networks and the object network.

If the CW size for the object network is smaller than the maximum CW size $CW_{max}$, the target node doubles the CW size for the object network, and returns to operation 405 to participate in the contention. If the CW size for the object network reaches the maximum CW size $CW_{max}$, the target node returns to operation 405 to participate in the contention again without increasing the CW size for the object network any longer.

Figure 5:
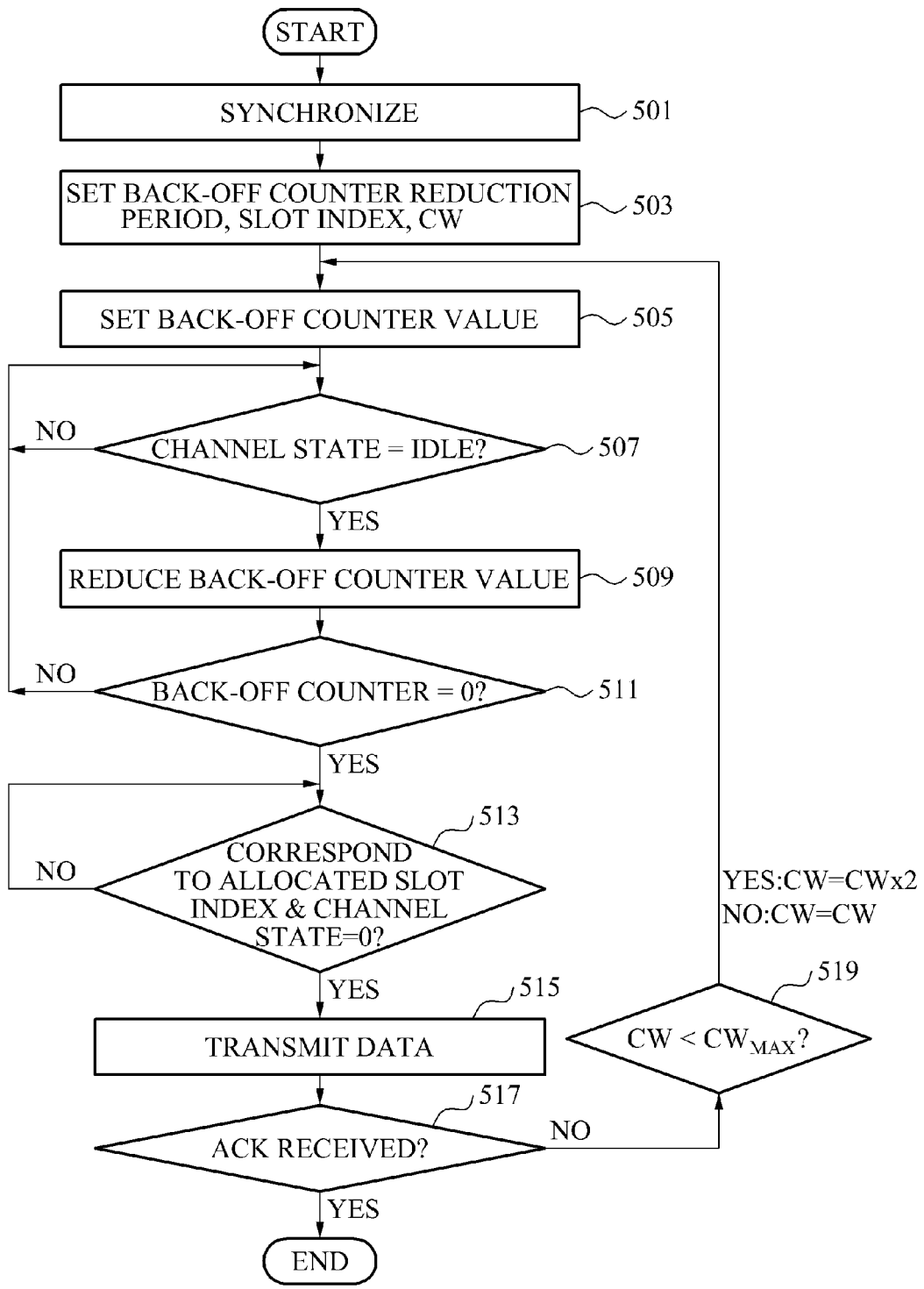
FIG. 5 is a flowchart illustrating another example of a method of preventing collision between networks communicating based on the CSMA/CA.

FIG. 5 illustrates another example of a method of preventing collision between networks communicating based on the CSMA/CA. Similar to FIG. 4, in the example of FIG. 5, existence of the coexisting, neighboring networks is recognized first, and then, time between one or more neighboring networks and an object network is synchronized. The object network includes a target node, while the neighboring networks include one or more respective neighboring nodes.

In operation 501, the target node performs time synchronization with the neighboring networks. For example, the target node may synchronize a time period between the neighboring networks and the object network with a first time period, for example, an N-slot period, based on a number of the networks. In another example, the target node may synchronize a time period in the object network with a second time period, for example, an 1-slot period, which is distinguished from the first time period. In this example, the target node may synchronize the object network with the neighboring networks by the aforementioned 2-step synchronization control method. The target node may recognize the number of the networks or the nodes.

In operation 503, the target node sets or allocates a back-off counter reduction period for the neighboring networks and the object network, and a slot index for the object network, based on the number of the networks. Additionally, to prevent a reduction in an efficiency of resource use, the target node sets or allocates a CW size smaller than a maximum CW value $CW_{max}$ used in a non-coexistence environment. The target node may allocate the slot index for the object network based on a system parameter including a beacon shifting sequence index and/or a network ID, of the object network.

In operation 505, the target node sets a back-off counter value for the object network to any one value selected based on the CW size. For example, the target node may set the back-off counter value to a value randomly selected from 1 to the CW size, that is, [1, CW].

Next, the target node reduces the back-off counter value for the object network based on a channel state of the target node. In more detail, in operation 507, the target node determines whether the channel state is an idle state. If the channel state is the idle state, in operation 509, the target node reduces the back-off counter value by 1. Conversely, if the channel state is not the idle state, the target node returns to operation 507, and waits until the channel state enters the idle state.

Next, the target node transmits data related to the neighboring networks based on whether the back-off counter value is reduced to a first value, for example, 0, and whether the slot index allocated to the object network corresponds to a contention slot index of a current time slot for the neighboring networks and the object network. In more detail, in operation 511, the target node determines whether the back-off counter value is equal to 0. If the back-off counter value is equal to 0, in operation 513, the target node determines whether the slot index allocated to the object network corresponds to the contention slot index. That is, the target node determines whether the contention slot index of the synchronized time slot corresponds to the slot index allocated to the object network including the target node. Also, the target node determines whether the channel state is the idle state. If the back-off counter value is not equal to 0, the target node returns to operation 507, and waits until the channel state enters the idle state.

If the slot index allocated to the object network corresponds to the contention slot index, and if the channel state is the idle state, in operation 515, the target node transmits the data related to the neighboring networks. Otherwise, the target node returns to operation 513, and waits until these conditions are met.

Next, the target node resumes contention for data transmission based on whether a response to the data transmission, that is, an acknowledgement (ACK) signal denoting the data transmission is successfully received at a receiving end. In more detail, in operation 517, the target node determines whether the ACK signal is received in response to the data transmission. If the ACK is received, the method ends. Conversely, if the ACK is not received, in operation 519, the target node determines whether the CW size for the object network is smaller than the maximum CW size $CW_{max}$ for the neighboring networks and the object network.

If the CW size for the object network is smaller than the maximum CW size $CW_{max}$, the target node doubles the CW size for the object network, and returns to operation 505 to participate in the contention. If the CW size for the object network reaches the maximum CW size $CW_{max}$, the target node returns to operation 505, and participates in the contention again without increasing the CW size for the object network any longer.

Figure 6:
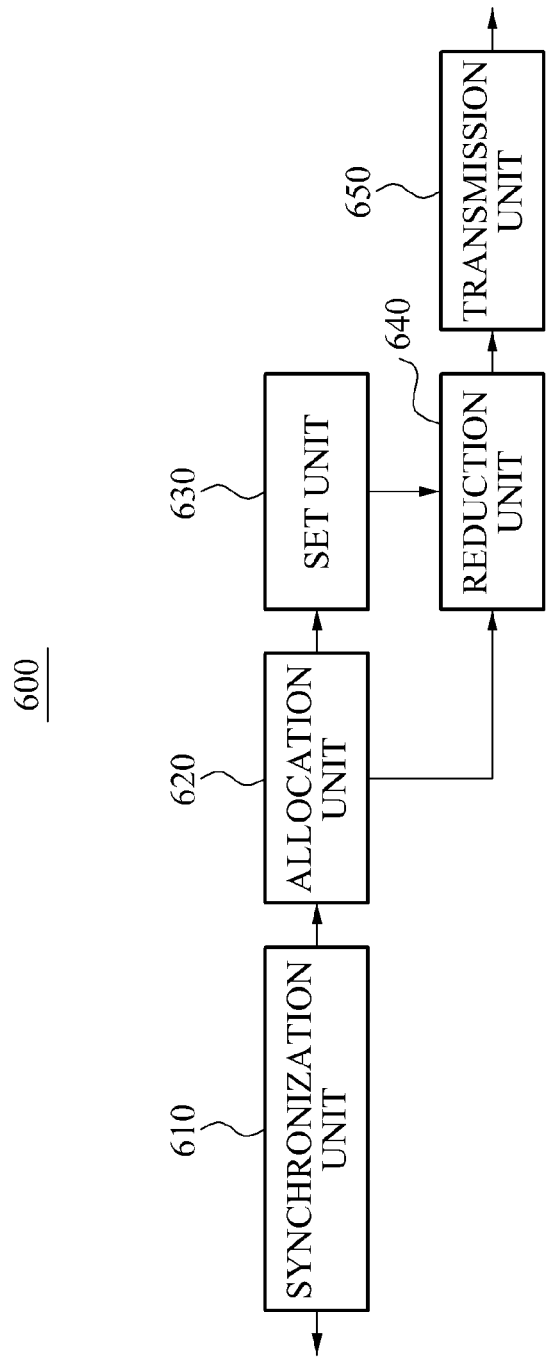
FIG. 6 is a block diagram illustrating an example of a target node configured to prevent collision between networks communicating based on the CSMA/CA.

FIG. 6 illustrates an example of a target node 600 configured to prevent collision between networks communicating based on the CSMA/CA. The target node 600 includes a synchronization unit 610, an allocation unit 620, a set unit 630, a reduction unit 640, and a transmission unit 650.

The synchronization unit 610 synchronizes one or more neighboring nodes with the target node 600, which communicate based on CSMA/CA. For example, the synchronization unit 610 may synchronize a time period between the neighboring nodes and the target node 600 with a first time period based on a number of the networks or nodes. In another example, the synchronization unit 610 may synchronize a time period in the target node 600 with a second time period, which is distinguished from the first time period.

The allocation unit 620 sets or allocates a back-off counter reduction period for the neighboring nodes and the target node 600, a slot index for the target node 600, based on the number of the networks or nodes. The allocation unit 620 further allocates a CW size for the target node 600. The allocation unit 620 may allocate the slot index for the target node 600 based on a system parameter including a beacon shifting sequence index and/or a network ID, of the target node 600.

The set unit 630 sets or allocates a back-off counter value for the target node 600 to any one value selected based on the CW size. The reduction unit 640 may reduce the back-off counter value based on a channel state, and may reduce the back-off counter value further based on the slot index allocated to the target node 600. For example, the reduction unit 640 may reduce the back-off counter value based on whether the channel state is an idle state, and whether the slot index corresponds to a contention slot index of a current time slot for the neighboring nodes and the target node 600.

The transmission unit 650 transmits data related to the neighboring networks based on whether the back-off counter value is reduced to 0. Additionally, the transmission unit 650 may transmit the data based on whether the channel state is the idle state, and whether the slot index corresponds to the contention slot index.

According to the teachings above, there is provided a method and a target node, which may prevent collisions between neighboring homogeneous networks based on CSMA/CA by adjusting back-off counter reduction periods of nodes included in the networks. As a result, an efficiency of resource use may be increased.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. For example, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments accomplishing the examples disclosed herein can be easily construed by programmers skilled in the art to which the examples pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of preventing collision between networks communicating based on a carrier sense multiple access/collision avoidance (CSMA/CA) scheme, the method comprising:
   synchronizing an object network with a neighboring network;
   allocating, to the object network, a slot index based on a number of the networks, and a contention window (CW) size;
   setting, for the object network, a back-off counter value based on the CW size;
   reducing the back-off counter value based on a channel state of the object network and the slot index; and
   transmitting data related to the neighboring network based on the back-off counter value.

2. The method of claim 1, further comprising:
   allocating, to the object network, a back-off counter reduction period based on the number of the networks.

3. The method of claim 1, wherein the synchronizing comprises:
   synchronizing a time period between the neighboring network and the object network with a first time period based on the number of the networks; and
   synchronizing a time period in the object network with a second time period, which is distinguished from the first time period.

4. The method of claim 1, wherein the allocating comprises:
   allocating, to the object network, the slot index based on a beacon shifting sequence index, or a network identifier (ID), or any combination thereof.

5. The method of claim 1, wherein the reducing comprises:
   determining whether the channel state is an idle state;
   determining whether the slot index corresponds to an index of a time slot of the neighboring network and the object network; and
   reducing the back-off counter value if the channel state is the idle state, and the slot index corresponds to the index.

6. The method of claim 1, wherein the transmitting comprises:
   determining whether the back-off counter value is equal to zero; and
   transmitting the data if the back-off counter value is equal to zero.

7. The method of claim 1, further comprising:
   determining whether a response to the transmitting is received; and
   resuming contention for transmission of the data if the response to the transmitting is received.

8. The method of claim 7, further comprising:
  determining whether the CW size is less than a maximum CW size of the neighboring network and the object network; and
  increasing the CW size if the CW size is less than the maximum CW size,
  wherein the resuming comprises resuming the contention for the transmission of the data based on the increased CW size.

9. A non-transitory computer-readable storage medium storing a program comprising instructions to cause a computer to implement the method of claim 1.

10. A method of preventing collision between networks communicating based on a carrier sense multiple access/collision avoidance (CSMA/CA) scheme, the method comprising:
  synchronizing an object network with a neighboring network;
  allocating, to the object network, a slot index based on a number of the networks, and a contention window (CW) size;
  setting, for the object network, a back-off counter value based on the CW size;
  reducing the back-off counter value based on a channel state of the object network and the slot index; and
  transmitting data related to the neighboring network based on the back-off counter value, the slot index, and the channel state.

11. The method of claim 10, further comprising:
  allocating, to the object network, a back-off counter reduction period based on the number of the networks.

12. The method of claim 10, wherein the synchronizing comprises:
  synchronizing a time period between the neighboring network and the object network with a first time period based on the number of the networks; and
  synchronizing a time period in the object network with a second time period, which is distinguished from the first time period.

13. The method of claim 10, wherein the allocating comprises:
  allocating, to the object network, the slot index based on a beacon shifting sequence index, or a network identifier (ID), or any combination thereof.

14. The method of claim 10, wherein the reducing comprises:
  determining whether the channel state is an idle state; and
  reducing the back-off counter value if the channel state is the idle state.

15. The method of claim 10, wherein the transmitting comprises:
  determining whether the back-off counter value is equal to zero;
  determining whether the slot index corresponds to an index of a time slot of the neighboring network and the object network, and whether the channel state is an idle state; and
  transmitting the data if the back-off counter value is equal to zero, the slot index corresponds to the index, and the channel state is the idle state.

16. The method of claim 10, further comprising:
  determining whether a response to the transmitting is received; and
  resuming contention for transmission of the data if the response to the transmitting is received.

17. The method of claim 16, further comprising:
  determining whether the CW size is less than a maximum CW size of the neighboring network and the object network; and
  increasing the CW size if the CW size is less than the maximum CW size,
  wherein the resuming comprises resuming the contention for the transmission of the data based on the increased CW size.

18. A target node configured to prevent collision between networks communicating based on a carrier sense multiple access/collision avoidance (CSMA/CA) scheme, the target node comprising:
  a synchronization unit configured to synchronize the target node with a neighboring node;
  an allocation unit configured to allocate, to the target node, a slot index based on a number of the networks, and a contention window (CW) size;
  a set unit configured to set, for the target node, a back-off counter value based on the CW size;
  a reduction unit configured to reduce the back-off counter value based on a channel state of the target node and the slot index; and
  a transmission unit configured to transmit data related to the neighboring node based on the back-off counter value.

19. The target node of claim 18, wherein the synchronization unit is further configured to:
  synchronize a time period between the neighboring node and the target node with a first time period based on the number of the networks; and
  synchronize a time period in the target node with a second time period, which is distinguished from the first time period.

20. The target node of claim 18, wherein the allocation unit is further configured to:
  allocate, to the target node, a back-off counter reduction period based on the number of the networks; and
  allocate, to the target node, the slot index based on a beacon shifting sequence index, or a network identifier (ID), or any combination thereof.

21. The target node of claim 18, wherein the reduction unit is further configured to:
  determine whether the channel state is an idle state;
  determine whether the slot index corresponds to an index of a time slot of the neighboring node and the target node; and
  reduce the back-off counter value if the channel state is the idle state, and the slot index corresponds to the index.

22. The target node of claim 18, wherein the transmission unit is further configured to:
  determine whether the back-off counter value is equal to zero; and
  transmit the data if the back-off counter value is equal to zero.

23. A target node configured to prevent collision between networks communicating based on a carrier sense multiple access/collision avoidance (CSMA/CA) scheme, the target node comprising:
  a synchronization unit configured to synchronize the target node with a neighboring node;
  an allocation unit configured to allocate, to the target node, a slot index based on a number of the networks, and a contention window (CW) size;
  a set unit configured to set, for the target node, a back-off counter value based on the CW size;

a reduction unit configured to reduce the back-off counter value based on a channel state of the target node and the slot index; and a transmission unit configured to transmit data related to the neighboring node based on the back-off counter value, the slot index, and the channel state.

24. The target node of claim 23, wherein the synchronization unit is further configured to:

synchronize a time period between the neighboring node and the target node with a first time period based on the number of the networks; and synchronize a time period in the target node with a second time period, which is distinguished from the first time period.

25. The target node of claim 23, wherein the allocation unit is further configured to:

allocate, to the target node, a back-off counter reduction period based on the number of the networks; and allocate, to the target node, the slot index based on a beacon shifting sequence index, or a network identifier (ID), or any combination thereof.

26. The target node of claim 23, wherein the reduction unit is further configured to:

determine whether the channel state is an idle state; and reduce the back-off counter value if the channel state is the idle state.

27. The target node of claim 23, wherein the transmission unit is further configured to:

determine whether the back-off counter value is equal to zero;

determine whether the slot index corresponds to an index of a time slot of the neighboring node and the target node, and whether the channel state is an idle state; and transmit the data if the back-off counter value is equal to zero, the slot index corresponds to the index, and the channel state is the idle state.

* * * * *